Sept. 1, 1931.  G. CRISSON  1,821,006

MEASUREMENT OF NEGATIVE RESISTANCE

Filed Aug. 10, 1928

INVENTOR
G. Crisson
BY
ATTORNEY

Patented Sept. 1, 1931

1,821,006

UNITED STATES PATENT OFFICE

GEORGE CRISSON, OF EAST ORANGE, NEW JERSEY, ASSIGNOR TO AMERICAN TELEPHONE AND TELEGRAPH COMPANY, A CORPORATION OF NEW YORK

MEASUREMENT OF NEGATIVE RESISTANCE

Application filed August 10, 1928. Serial No. 298,851.

This invention relates to measurements of negative resistances, and has for its object the provision of a method for readily accomplishing such measurements and the provision of means by which the measurements may be carried out with expedition and precision.

Negative resistances may take on a variety of forms and find a variety of applications, some of these being disclosed in my copending application, Serial No. 279,060, filed May 19, 1928 now Patent No. 1,776,310, Sept. 23, 1930. In connection with such uses, it becomes necessary at times to know the magnitude of the negative resistance, and the purpose of this application is to disclose methods and means for finding these magnitudes.

Figure 1:
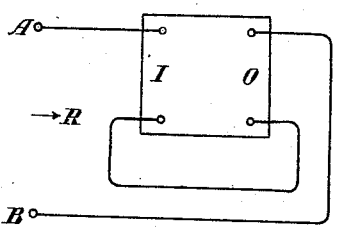
Figure 2:
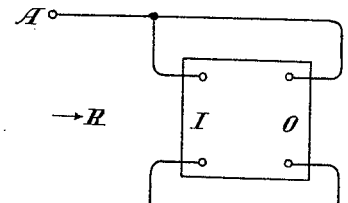
Figure 1A:
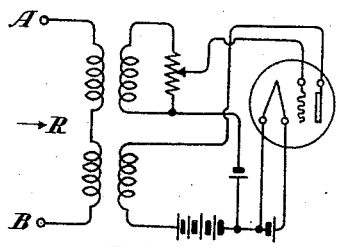
Figure 2A:
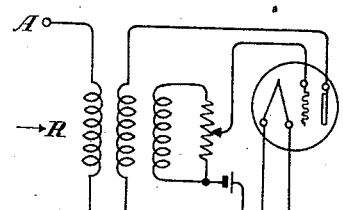

The invention will be better understood by reference to the following specification and the accompanying drawings, in which Figures 1 and 2 show, schematically, different forms of negative resistances; Figs. 1a and 2a show more in detail the electrical circuits which may yield the negative resistances of Figs. 1 and 2, and Figs. 3, 4 and 5 show various measuring circuits.

In my investigations of negative resistances, I have found that one very useful form can be obtained by use of amplifying tubes of the three-element vacuum tube type, associated with electrical circuits to bring out the desired characteristics. In my copending application, cited above, I have shown that these negative resistances may be classified as the series type and the shunt type, with importantly different and useful characteristics, and I have described the manner in which they behave, and how they may be used. For the understanding of the invention of this application, it will not be necessary to enter into the full details regarding these resistances, but reference may be had to the said copending application. Referring, however, to the drawings, Fig. 1 represents a series type of negative resistance, and more specifically relates to a device which has intrinsically an input and an output circuit, each with two terminals. The input and the output circuits are connected in series and yield a circuit of two terminals A and B, which, upon insertion in a circuit, behaves like a negative resistance, introducing power into the circuit as a whole. One specific circuit connection, which will behave in the manner described, is shown in Fig. 1a and comprises a three-electrode vacuum tube of amplifying properties, the input and the output circuits of which are connected in a manner which is obvious from the drawing, and which is explained more in detail in my copending application.

Fig. 2 shows schematically a shunt type of negative resistance and again comprises essentially a power delivering device with input and output circuits, these latter being connected in parallel in the manner shown, yielding a device with the two terminals A, B exhibiting the properties of a negative resistance by virtue of its ability to deliver instead of absorb power when properly adjusted; Fig. 2a shows, in greater detail, one specific form which the shunt circuit of Fig. 2 may take on and again comprises a three-electrode vacuum tube with amplifying properties, the input and the output circuits being associated in parallel or shunt and being more fully described in my copending application.

The purpose of this invention is to disclose a method and means for measuring the magnitude of the negative resistances of such circuits as have been described. It is to be understood, however, that the invention is not limited to the specific forms of negative resistances which are shown, but relate to any form of negative resistance.

Figure 3:
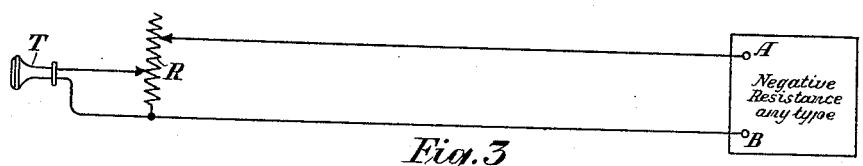

It is a characteristic of circuits containing positive resistance and negative resistance of the series type that if their algebraic sum is equal to zero, any disturbance set up in the circuit will maintain itself indefinitely, and if the algebraic sum is a negative quantity, any disturbance will give rise to the oscillatory or singing condition, the amplitude of the oscillations building up until a limiting condition is reached, at whch the total resistance of the circuit is equal to zero. If, on the other hand, the negative resistance is of the shunt type, then oscillations will be set up if the algebraic sum of the resistances is positive, and these oscillations will cease if the positive resistance is less than the magnitude of the negative resistance. The method, then, which I use for finding the magnitude of a negative resistance is shown in Fig. 3, in which a positive pure resistance R is connected with a negative resistance which may be of any type. The adjustment of the resistance R included in circuit with the negative resistance is set for the condition at which disturbances will just be maintained, or at which a very slight oscillatory condition will be set up. For the series type of negative resistance, this means that the resistance R should be large to start with and should gradually be reduced until the condition mentioned above is attained. On the other hand, if the negative resistance is of the shunt type, the initial value of R should be small and should be gradually increased until again the slight oscillatory condition is attained. Thus there is provided immediately a ready and accurate method for determining the magnitude of the negative resistance. In this, as in the following case to be mentioned, it is desirable that the detecting device shall have as small an effect on the circuit as possible. In general, therefore, it will be advisable that this detecting device be one of high impedance and that it be connected across such a small portion of the resistance R that its reaction on the circuit will be negligibly small.

Some negative resistances have different values for the magnitude of the resistance at different frequencies. In such case, the oscillations would occur at that frequency in which a series of negative resistance has its maximum magnitude. However, the resistance may be found at any other frequency by arranging the circuit such that its impedance would be a minimum at the frequency at which measurements are desired. In the case of the series type of resistance, this may be accomplished in the manner shown in Fig. 4, in which a series inductance L and capacity C are connected in series in the circuit. At the frequency for which the inductance and capacity are tuned, their impedance will be zero, but at any other frequency they will offer a substantial impedance, and the oscillatory condition will therefore be set up in this circuit at the particular frequency for which L and C are in tune. Measurements of the magnitude of the negative resistance may therefore be obtained at this particular frequency, and, by changing the values of L or C, it is possible to obtain the desired measurements at any other frequency.

Figure 5:
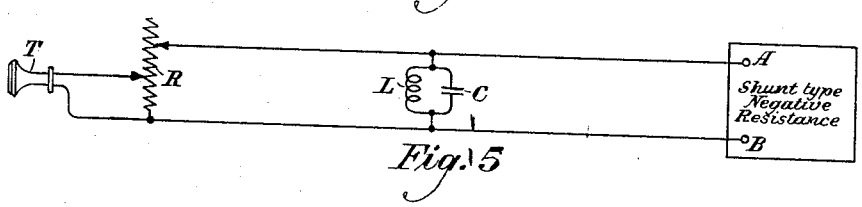

In the case of the shunt type negative resistance, this tuned circuit should be placed in parallel connection, as shown in Fig. 5, and, by varying the natural frequency of this parallel tuned circuit, the measurements may be obtained at any desired frequency. It will also be clear from the description in my copending application that in the case of the shunt negative resistance, the resistance R should be started at a low value, in which case no oscillations take place. As R is increased, however, the point will be reached at which any slight disturbance will result in the building up of oscillations, and this may be taken as the magnitude of the negative resistance.

Figure 4:
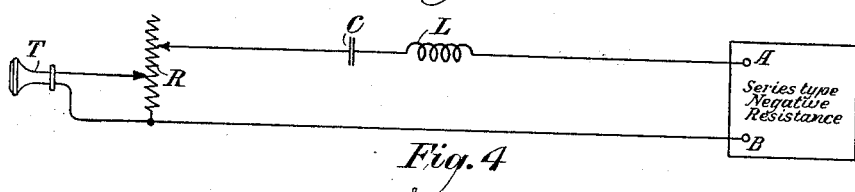

Some of these negative resistances have a pure resistance only, whereas others may possess a certain amount of reactance, either inductive or capacitive, and it may be desired to find the amount of this reactance. This can be accomplished with either type of negative resistance. In Fig. 4, for example, if the resistance possesses an inductive reactance, one may insert in series with it a capacity only. Upon the gradual reduction of the resistance R, oscillations will finally take place at that frequency for which this external capacity with the internal inductance are in tune, and, by noting the value of this capacity and the frequency of oscillations, it is possible to calculate the inductive reactance of the negative resistance. Similarly, if the negative resistance has a capacity reactance, then it will be necessary to include an inductance in the external circuit. The same procedure relates to the shunt type of negative resistance of Fig. 5.

I claim:

1. In the measurement of the magnitude of a negative resistance, the method which consists in inserting a series positive resistance in circuit with a negative resistance annulling the reactance of the negative resistance and adjusting the positive resistance to a value equal to the negative resistance.

2. In the measurement of the magnitude of a negative resistance at a certain frequency, the method which consists in associating with the negative resistance a positive resistance and a tuned circuit, and adjusting the positive resistance to a value which just permits singing.

3. In a circuit for the measurement of a negative resistance, a positive resistance associated with the negative resistance, means for adjusting the positive resistance to equality with the negative resistance, and means for detecting this equality.

4. In a circuit for the measurement of a negative resistance, a positive resistance and a tuned circuit associated with the negative resistance, means for adjusting the positive resistance to equality with the negative resistance, and means for detecting this equality.

In testimony whereof, I have signed my name to this specification this 8th day of August, 1928.

GEORGE CRISSON.